United States Patent [19]

Sugimura

[11] Patent Number: 4,793,381

[45] Date of Patent: Dec. 27, 1988

[54] BLADDER SUPPORTING DEVICE IN AN ACCUMULATOR

[76] Inventor: Nobuyuki Sugimura, 308, Mabase, Shimizu-shi, Shizuoka-ken, Japan

[21] Appl. No.: 121,790

[22] Filed: Nov. 16, 1987

[30] Foreign Application Priority Data

Nov. 22, 1986 [JP] Japan .......................... 61-179892[U]

[51] Int. Cl.[4] .............................................. F16L 55/04

[52] U.S. Cl. ...................................... 138/30; 220/85 B

[58] Field of Search ............................. 135/26, 30, 31; 220/85 B

[56] References Cited

U.S. PATENT DOCUMENTS

| | | | |
|---|---|---|---|
| Re. 23,199 | 2/1950 | Baker | 138/114 |
| 3,148,706 | 9/1964 | Mercier | 138/30 |
| 3,220,594 | 11/1965 | Ortheil et al. | 138/30 X |
| 3,788,358 | 1/1974 | Taki | 138/30 |

FOREIGN PATENT DOCUMENTS

| | | | |
|---|---|---|---|
| 1525476 | 7/1969 | Fed. Rep. of Germany | 138/30 |

*Primary Examiner*—James E. Bryant, III

*Attorney, Agent, or Firm*—Wood, Dalton, Phillips, Mason & Rowe

[57] ABSTRACT

In a bladder supporting device in an accumulator of the type that a flange of a bladder is pinched by a vessel main body having a step formed on its inner wall surface and a hook-shaped press edge of a lid member, and a support ring fitted in an annular groove on the outside of the flange is engaged with the step; the support ring is formed by folding back an inside half of an annular sheet metal under an outside half thereof so that an inner circumferential surface of the support ring may be of circular arc shape in vertical cross-section.

4 Claims, 4 Drawing Sheets

BLADDER SUPPORTING DEVICE IN AN ACCUMULATOR

BACKGROUND OF THE INVENTION

The present invention relates to device for simply and cheaply supporting a bladder from a vessel main body of an accumulator for use in accumulation, absorption of pulsation and the like of pressurized liquid.

Heretofore, in the case of supporting a bladder from a vessel main body of an accumulator, as shown partly in an enlarged scale in FIG. 6, a support ring 12 having its inner circumferential surface 12a shaped into a circular arc in vertical cross-section is formed from a pipe material, the support ring 12 is fitted into a groove 15 formed in a flange 14 of a bladder 13, then the bladder 13 is inserted into a vessel main body 16 with the support ring 12 engaged with a step 17 formed in an inner circumferential surface of the vessel main body 16, and thereby the bladder is supported from the vessel main body 16.

In the case of forming the support ring 12 for the bladder 13 by subjecting a pipe material to lathe turning as described above, not only the support ring 12 becomes expensive due to an increased machining expense, but also when the inner circumferential surface 12a having a vertical cross-section of circular arc shape is shaped, since the machining is effected in such manner that the inner circumferential surface is shape up from the upper and lower sides, respectively, and the respective machined surfaces may coincide at the crest portion, it is difficult to make the respective machined surfaces perfectly coincide with each other. Though it is not seen with the naked eye, if it is observed as being optically enlarged, in most cases a step 18 is produced on the machined surface as shown in FIG. 6. Consequently, in the prior art, there was a problem that if the groove 15 in the bladder 13 is strongly pressed against the above-mentioned step 18, the inner surface of this groove 15 would be hurt by the step 18, this hurt would gradually become large by repeated expansion and contraction of the bladder, resulting in damage of the groove 15, and hence a life of the bladder 13 would be shortened thereby.

The present invention has been worked out in order to resolve the above-mentioned problem in the prior art, and has it as an object that to provide a supporting device for a bladder which device is cheap and would not damage the flange of the bladder.

SUMMARY OF THE INVENTION

The present invention provides a bladder supporting device in an accumulator of the type that a flange of a bladder is pinched by a vessel main body having a step formed on its inner wall surface and a hook-shaped press edge of a lid member, and a support ring fitted in an annular groove on the outside of the flange is engaged with the step, characterized in that the support ring is so shaped that a vertical cross-section of its inner circumferential surface may have a circular arc shape by folding back an inside half of an annular metal sheet under an outside half of the same.

DESCRIPTION OF THE PREFERRED EMBODIMENT

Now one preferred embodiment of the bladder supporting device in an accumulator according to the present invention will be described in detail with reference to the accompanying drawings.

Figure 2:
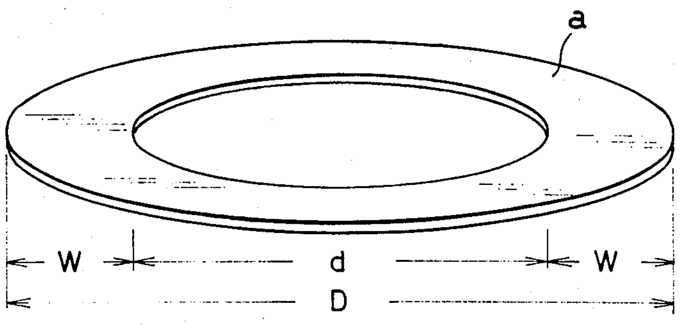
FIG. 2 is a perspective view of an annular sheet metal from which a support ring used in the bladder supporting device in FIG. 1 is formed.
Figure 4:
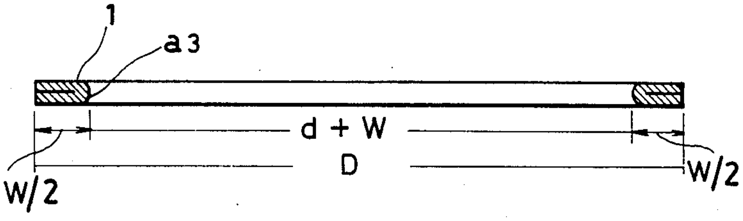
FIG. 4 is a longitudinal cross-section front view of a support ring completed by folding back an inside half of the same sheet metal under an outside half of the same and then stamping out the folded sheet metal into a desired outer diameter.
Figure 5:
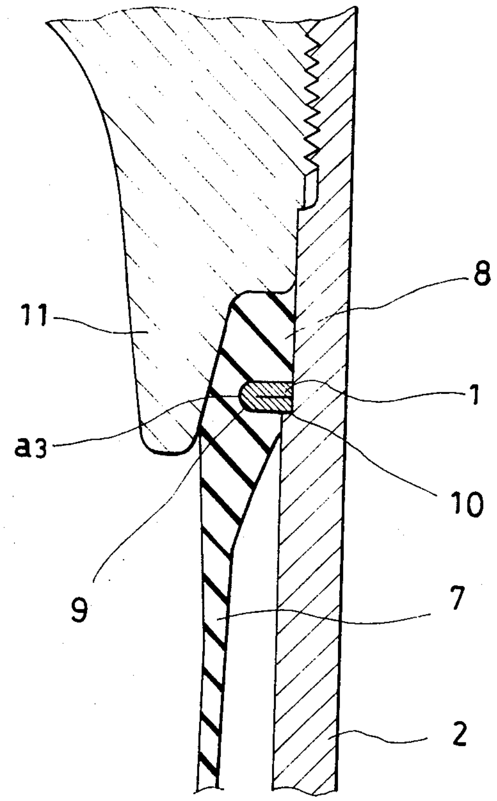
FIG. 5 is a partial enlarged longitudinal cross-section front view showing a state of supporting a bladder flange by means of the support ring shown in FIG. 4.
Figure 6:
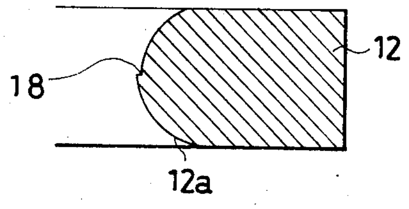
FIG. 6 PRIOR ART
FIG. 6 is a partial enlarged longitudinal cross-section front view of a flange support ring in the prior art which was formed from a pipe material by lathe turning.
Figure 7:
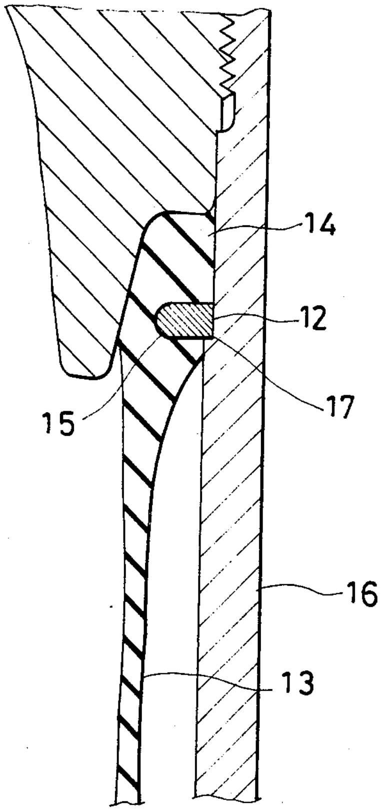
FIG. 7 PRIOR ART
FIG. 7 is a partial enlarged longitudinal cross-section front view showing a state of supporting a bladder flange by means of the support ring in the prior art shown in FIG. 6.

In FIG. 4, reference numeral 1 designates a support ring for a bladder 7 as will be described later, and this support ring 1 is formed through the following process. At first, an annular sheet metal a as shown in FIG. 2 is formed by stamping out from a thin sheet material such as, for example, a cold rolled steel plate (SPC). An inner diameter d of this annular sheet metal a is smaller than an inner diameter of a flange 8 of the bladder 7, its outer diameter D is larger than an outer diameter of the flange 8, and its width W is larger than twice of a depth of an annular groove 9 in the flange 8.

Figure 3:
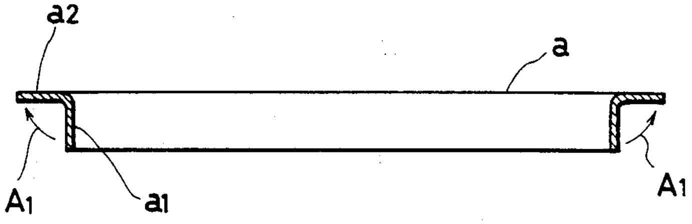
FIG. 3 is a longitudinal cross-section front view of the same sheet metal under the state where an inside half of the sheet metal is bent vertically.

An inside half $a_2$ of this stamped annular sheet metal a is bent downwards at a right angle through hot or cold press working, then the bent portion is expanded to the outside and is folded back under an outside half of the annular sheet metal a as shown by arrow $A_1$ in FIG. 3, and thereby a support ring having an inner circumferential surface $a_3$ shaped into a circular arc shape in vertical cross-section can be formed. The inner diameter of the support ring 1 is nearly equal to an inner diameter of the annular groove 9 in the flange 8.

Figure 1:
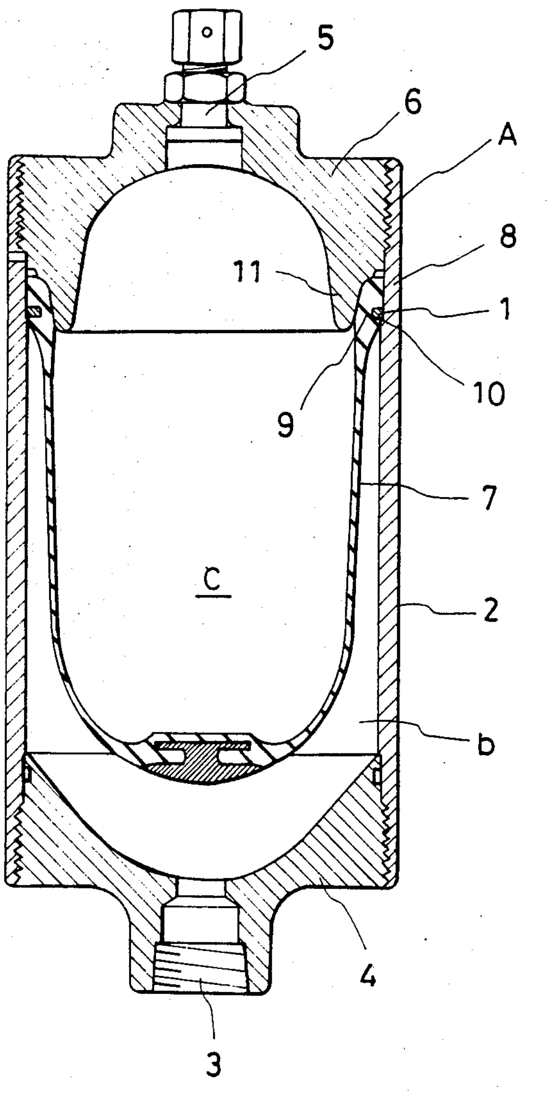
FIG. 1 is a longitudinal cross-section front view showing one preferred embodiment of an accumulator employing a bladder supporting device according to the present invention.

In FIG. 1, reference numeral 2 designates a cylindrical vessel main body in an accumulator A, at the bottom of which is fixedly secured by threaded mating a bottom member 4 provided with a feed/exhaust port 3 of liquid at its lower end, and at the top of which is detachably and threadedly mated a lid member 6 provided with a sealing valve 5 of gas at its upper end.

On an inner wall surface of an upper portion of the vessel main body 2 is formed a step 10 to be engaged with the support ring 1, and a hook-shaped press edge 11 for pressing the flange 8 of the bladder 7 is provided at a lower portion of the lid member 6.

The bladder 7 is accommodated within the vessel main body 2 to partition a liquid chamber b on its outside from a gas chamber c on its inside, it is made of natural or synthetic rubber, and the flange 8 to be used for mounting is provided along the circumference of its top end. On the outside of a lower portion of The flange 8 is formed an annular groove 9, and a vertical cross-section of this groove 9 is of U-shaped as to conform with the support ring 1, that is, so that the depth of the annular groove 9 may be nearly equal to the width W/2 of the support ring 1.

Now description will be made on the operation of this preferred embodiment. The support ring 1 having its inner circumferential surface $a_3$ shaped in a circular arc in vertical cross-section is formed through the process described above, the inner circumferential surface $a_3$ of the support ring 1 is fitted in the annular groove 9 provided in the flange 8 of the bladder 7, and when this bladder 7 is inserted into the vessel main body 2 through its upper opening, the support ring 1 integrated with the bladder 7 is engaged with the step 10 provided on the inner wall surface of the vessel main body 2. Hence, under this engaged condition, if the lid member 6 is threadedly mated with the vessel main body 2, with its hook-shaped press edge 11 inserted into the opening of the bladder 7, then the flange 8 of the bladder 7 is pinched from its four sides by the support ring 1, the inner wall surface of the vessel main body 2 and the hook-shaped press edge 11 of the lid member 6, and thereby the bladder 7 can be firmly mounted to the vessel main body 2 with perfect air-tightness maintained within the vessel main body 2 so that separation thereof may not occur ever under an action of a high pressure.

The supporting device for the flange of the bladder in the accumulator according to the present invention can provide inherent advantages that since the support ring can be easily and speedily formed by press work for a sheet metal, a manufacturing cost is reduced to nearly one-half as compared to the product in the prior art which was made by lathe turning work for a pipe material, and also that since a circular arc cross-section configuration of the inner circumferential surface is formed by folding back a sheet metal, a step liable to hurt the flange of the bladder is not produced at this circumferential portion, hence the flange would not be hurt even if the accumulator is used under a high pressure, and therefore, a life of the bladder would not be shortened.

What is claimed is:

1. In an accumulator having a vessel with a cylindrical inner wall, said inner wall including a step formed at an upper portion thereof, a bladder dividing the vessel into a first chamber and a second chamber, said bladder having a bladder flange, and a lid member capable of mated attachment to the vessel including a hook-shaped press edge at a lower portion of the lid member for capturing a bladder flange between said lid member and said step, a bladder support device comprising:

an annular support ring having an inner surface of circular arc cross-section transverse the ring and substantially parallel upper and lower legs;

said ring being formed of sheet metal in one piece folded upon itself to form said arc and said upper and lower legs, the lower ring leg engaging the step in the vessel;

the bladder having a circumferential groove formed in an outer surface beneath an upper portion of the bladder flange;

wherein a clearance between the inner surface of said arc of the support ring and the press edge is less than the thickness of the upper portion of the bladder flange, said groove receives said ring and the bladder being mounted within the vessel with said ring engaging said step.

2. A bladder supporting device in an accumulator as claimed in claim 1, characterized in that said annular sheet metal support ring is made of a cold rolled steel plate.

3. A bladder supporting device in an accumulator as claimed in claim 1, characterized in that a portion of said annular sheet metal support ring is folded back under a remaining portion of the same through cold working.

4. A bladder supporting device is an accumulator as claimed in claim 1 characterized in that said annular groove is U-shaped.

* * * * *